(12) United States Patent
Lindemann

(10) Patent No.: US 9,413,533 B1
(45) Date of Patent: Aug. 9, 2016

(54) SYSTEM AND METHOD FOR AUTHORIZING A NEW AUTHENTICATOR

(71) Applicant: NOK NOK LABS, INC., Palo Alto, CA (US)

(72) Inventor: Rolf Lindemann, Steele (DE)

(73) Assignee: NOK NOK LABS, INC., Palo Alto, CA (US)

( * ) Notice: Subject to any disclaimer, the term of this patent is extended or adjusted under 35 U.S.C. 154(b) by 25 days.

(21) Appl. No.: 14/268,686

(22) Filed: May 2, 2014

(51) Int. Cl.
*H04L 9/32* (2006.01)
*H04L 9/08* (2006.01)

(52) U.S. Cl.
CPC ............... *H04L 9/32* (2013.01); *H04L 9/0861* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 6,618,806 B1 | 9/2003 | Brown et al. | |
| 6,751,733 B1 | 6/2004 | Nakamura et al. | |
| 6,938,156 B2 | 8/2005 | Wheeler et al. | |
| 7,487,347 B2 | 2/2009 | Smith | |
| 7,487,357 B2 * | 2/2009 | Smith | G06F 21/335 713/176 |
| 7,512,567 B2 | 3/2009 | Bemmel et al. | |
| 7,698,565 B1 | 4/2010 | Bjorn et al. | |
| 7,865,937 B1 | 1/2011 | White | |
| 8,060,922 B2 | 11/2011 | Crichton | |
| 8,166,531 B2 | 4/2012 | Suzuki | |
| 8,245,030 B2 | 8/2012 | Lin | |
| 8,353,016 B1 | 1/2013 | Pravetz et al. | |
| 8,584,224 B1 | 11/2013 | Pei et al. | |
| 8,713,325 B2 | 4/2014 | Ganesan | |
| 8,719,505 B2 | 5/2014 | Ganesan | |
| 8,776,180 B2 | 7/2014 | Kumar et al. | |
| 8,856,541 B1 | 10/2014 | Chaudhury et al. | |
| 8,949,978 B1 | 2/2015 | Lin | |
| 8,958,599 B1 | 2/2015 | Starner | |
| 8,978,117 B2 | 3/2015 | Bentley et al. | |
| 9,032,485 B2 * | 5/2015 | Chu | H04L 63/0892 726/4 |
| 2002/0073316 A1 | 6/2002 | Collins et al. | |

(Continued)

FOREIGN PATENT DOCUMENTS

WO WO2013/082190 6/2013

OTHER PUBLICATIONS

Anthony J. Nicholson, "Mobile Device Security Using Transient Authentication," IEEE Transactions on Mobile Computing vol. 5, No. 11, pp. 1489-1502 (Nov. 2006).

(Continued)

*Primary Examiner* — Fatoumata Traore
(74) *Attorney, Agent, or Firm* — Nicholson De Vos Webster & Elliott LLP

(57) ABSTRACT

A system, apparatus, method, and machine readable medium are described for authorizing a new authenticator with a relying party. For example, one embodiment of a method comprises: identifying a plurality of relying parties with which an old authenticator is registered; generating at least one key for each of the plurality of relying parties; authenticating with each of the relying parties using a client having the old authenticator configured thereon, the client authorizing the new authenticator by providing an authorization object to each relying party comprising the at least one key, data identifying the new authenticator, and cryptographic data to be used by the relying party to verify the authorization object; and wherein, in response to verifying the authorization object, each relying party registers the new authenticator.

24 Claims, 8 Drawing Sheets

(56) References Cited

U.S. PATENT DOCUMENTS

| | | |
|---|---|---|
| 2003/0065805 A1 | 4/2003 | Barnes |
| 2003/0087629 A1 | 5/2003 | Juitt |
| 2003/0135740 A1 | 7/2003 | Talmor et al. |
| 2003/0152252 A1 | 8/2003 | Kondo |
| 2003/0226036 A1 | 12/2003 | Bivens et al. |
| 2004/0101170 A1 | 5/2004 | Tisse |
| 2004/0123153 A1 | 6/2004 | Wright et al. |
| 2005/0160052 A1 | 7/2005 | Schneider |
| 2005/0223236 A1 | 10/2005 | Yamada et al. |
| 2005/0278253 A1 | 12/2005 | Meek et al. |
| 2006/0029062 A1 | 2/2006 | Rao |
| 2006/0282670 A1 | 12/2006 | Karchov |
| 2007/0005988 A1 | 1/2007 | Zhang et al. |
| 2007/0088950 A1 | 4/2007 | Wheeler et al. |
| 2007/0107048 A1 | 5/2007 | Halls et al. |
| 2007/0165625 A1 | 7/2007 | Eisner |
| 2007/0168677 A1 | 7/2007 | Kudo |
| 2007/0169182 A1 | 7/2007 | Wolfond |
| 2007/0278291 A1 | 12/2007 | Rans et al. |
| 2008/0005562 A1 | 1/2008 | Sather et al. |
| 2008/0046334 A1 | 2/2008 | Lee et al. |
| 2008/0046984 A1 | 2/2008 | Bohmer et al. |
| 2008/0049983 A1 | 2/2008 | Miller et al. |
| 2008/0086759 A1 | 4/2008 | Colson |
| 2008/0134311 A1 | 6/2008 | Medvinsky |
| 2008/0172725 A1 | 7/2008 | Fujii et al. |
| 2008/0235801 A1 | 9/2008 | Soderberg et al. |
| 2008/0271150 A1 | 10/2008 | Boerger et al. |
| 2008/0289019 A1 | 11/2008 | Lam |
| 2008/0313719 A1 | 12/2008 | Kaliski, Jr. et al. |
| 2008/0320308 A1 | 12/2008 | Kostiainen et al. |
| 2009/0064292 A1 | 3/2009 | Carter et al. |
| 2009/0089870 A1 | 4/2009 | Wahl |
| 2009/0116651 A1* | 5/2009 | Liang .................. H04L 9/0836 380/278 |
| 2009/0133113 A1 | 5/2009 | Schneider |
| 2009/0138724 A1 | 5/2009 | Chiou et al. |
| 2009/0138727 A1 | 5/2009 | Campello |
| 2009/0158425 A1 | 6/2009 | Chan et al. |
| 2009/0183003 A1 | 7/2009 | Haverinen |
| 2009/0193508 A1 | 7/2009 | Brenneman |
| 2009/0235339 A1 | 9/2009 | Mennes et al. |
| 2009/0307139 A1 | 12/2009 | Mardikar et al. |
| 2010/0029300 A1 | 2/2010 | Chen |
| 2010/0042848 A1 | 2/2010 | Rosener |
| 2010/0070424 A1 | 3/2010 | Monk |
| 2010/0082484 A1 | 4/2010 | Erhart et al. |
| 2010/0105427 A1 | 4/2010 | Gupta |
| 2010/0169650 A1 | 7/2010 | Brickell et al. |
| 2010/0175116 A1 | 7/2010 | Gum |
| 2010/0186072 A1 | 7/2010 | Kumar |
| 2010/0223663 A1 | 9/2010 | Morimoto et al. |
| 2010/0242088 A1 | 9/2010 | Thomas |
| 2010/0325664 A1 | 12/2010 | Grebenick et al. |
| 2010/0325684 A1 | 12/2010 | Grebenik |
| 2010/0325711 A1 | 12/2010 | Etchegoyen |
| 2011/0004933 A1 | 1/2011 | Dickinson et al. |
| 2011/0022835 A1 | 1/2011 | Schibuk |
| 2011/0047608 A1 | 2/2011 | Levenberg |
| 2011/0078443 A1 | 3/2011 | Greenstein et al. |
| 2011/0082801 A1 | 4/2011 | Baghdasaryan et al. |
| 2011/0083016 A1 | 4/2011 | Kesanupalli et al. |
| 2011/0107087 A1 | 5/2011 | Lee et al. |
| 2011/0167154 A1 | 7/2011 | Bush et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0246766 A1 | 10/2011 | Orsini et al. |
| 2011/0265159 A1 | 10/2011 | Ronda |
| 2011/0279228 A1 | 11/2011 | Kumar |
| 2011/0280402 A1 | 11/2011 | Brahim |
| 2011/0296518 A1 | 12/2011 | Faynberg et al. |
| 2011/0307949 A1 | 12/2011 | Ronda |
| 2011/0314549 A1 | 12/2011 | Song et al. |
| 2012/0018506 A1 | 1/2012 | Hammad et al. |
| 2012/0023568 A1 | 1/2012 | Cha et al. |
| 2012/0046012 A1 | 2/2012 | Forutanpour et al. |
| 2012/0084566 A1 | 4/2012 | Chin et al. |
| 2012/0102553 A1 | 4/2012 | Hsueh et al. |
| 2012/0124651 A1 | 5/2012 | Ganesan |
| 2012/0159577 A1 | 6/2012 | Belinkiy |
| 2012/0191979 A1 | 7/2012 | Feldbau |
| 2012/0204032 A1 | 8/2012 | Wilkings |
| 2012/0272056 A1 | 10/2012 | Ganesan |
| 2012/0313746 A1 | 12/2012 | Rahman et al. |
| 2012/0317297 A1 | 12/2012 | Bailey |
| 2013/0042327 A1 | 2/2013 | Chow |
| 2013/0046976 A1 | 2/2013 | Rosati |
| 2013/0061055 A1 | 3/2013 | Schibuk |
| 2013/0073859 A1 | 3/2013 | Carlson et al. |
| 2013/0097682 A1 | 4/2013 | Zeljkovic |
| 2013/0119130 A1 | 5/2013 | Braams |
| 2013/0124285 A1 | 5/2013 | Pravetz et al. |
| 2013/0125197 A1 | 5/2013 | Pravetz |
| 2013/0125222 A1 | 5/2013 | Pravetz et al. |
| 2013/0133049 A1 | 5/2013 | Peirce |
| 2013/0144785 A1 | 6/2013 | Karpenko et al. |
| 2013/0159413 A1 | 6/2013 | Davis et al. |
| 2013/0159716 A1 | 6/2013 | Buck et al. |
| 2013/0337777 A1 | 12/2013 | Deutsch et al. |
| 2014/0007215 A1 | 1/2014 | Romano |
| 2014/0013422 A1 | 1/2014 | Janus et al. |
| 2014/0040987 A1 | 2/2014 | Haugsnes |
| 2014/0044265 A1 | 2/2014 | Kocher et al. |
| 2014/0066015 A1 | 3/2014 | Aissi |
| 2014/0068746 A1 | 3/2014 | Gonzalez |
| 2014/0075516 A1 | 3/2014 | Chermside |
| 2014/0089243 A1 | 3/2014 | Oppenheimer |
| 2014/0096182 A1 | 4/2014 | Smith |
| 2014/0101439 A1 | 4/2014 | Pettigrew et al. |
| 2014/0109174 A1 | 4/2014 | Barton |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan |
| 2014/0189360 A1 | 7/2014 | Baghdasaryan |
| 2014/0189779 A1 | 7/2014 | Baghdasaryan |
| 2014/0189791 A1 | 7/2014 | Lindemann |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan |
| 2014/0201809 A1 | 7/2014 | Choyi et al. |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |
| 2014/0289833 A1 | 9/2014 | Briceno et al. |
| 2014/0298419 A1 | 10/2014 | Boubez |
| 2015/0180869 A1* | 6/2015 | Verma .................. H04L 63/0838 726/4 |
| 2015/0269050 A1 | 9/2015 | Filimonov |
| 2015/0326529 A1 | 11/2015 | Morita |
| 2015/0381580 A1 | 12/2015 | Graham et al. |

OTHER PUBLICATIONS

Mohammad O. Derawi, "Unobtrusive User-Authentication on Mobile Phones using Biometric Gait Recognition" (2010).

BehavioSec, "Measuring FAR/FRR/EER in Continuous Authentication," Stockholm, Sweden (2009).

The Online Certificate Status Protocol (OCSP, RFC2560), 22 pages, Aug. 11, 2015. 950.

see current WikiPedia article for "Eye Tracking" at n.wikipedia.org/wiki/Eye_tracking, 15 pages, Jun. 21, 2014.

(see Hartzell, "Crazy Egg Heatmap Shows Where People Click on Your Website" (Nov. 30, 2012), currently at www.michaelhartzell.com/Blog/bid/92970/Crazy-Egg-Heatmap-shows-where-people-click-on-your-website).

(56) References Cited

OTHER PUBLICATIONS

Notification of Transmittal of the International Search Report and the Written Opinion from counterpart Patent Cooperation Treaty Application No. PCT/US13/77888, mailed Aug. 8, 2014, 10 pages.
Notification of Transmittal of the International Search Report and the Written Opinion from counterpart Patent Cooperation Treaty Application No. PCT/US14/39627, mailed Oct. 16, 2014, 3 pages.
Notification of Transmittal of the International Search Report and the Written Opinion from counterpart Patent Cooperation Treaty Application No. PCT/US14/31344, mailed Nov. 3, 2014, 8 pages.
Office Action from U.S. Appl. No. 14/066,384, mailed Jan. 7, 2015, 24 pages.
Office Action from U.S. Appl. No. 14/145,439, mailed Feb. 12, 2015, 18 pages.
Office Action from U.S. Appl. No. 14/145,533, mailed Jan. 26, 2015, 13 pages.
Office Action from U.S. Appl. No. 14/145,607, mailed Mar. 20, 2015, 22 pages.
Office Action from U.S. Appl. No. 14/218,551, mailed Apr. 23, 2015, 9 pages.
Office Action from U.S. Appl. No. 14/218,575, mailed Feb. 10, 2015, 17 pages.
Office Action from U.S. Appl. No. 14/066,273, mailed May 8, 2015, 31 pages.
Notice of Allowance from U.S. Appl. No. 14/145,533, mailed May 11, 2015, 5 pages.
Notice of Allowance from U.S. Appl. No. 14/145,439, mailed Jul. 6, 2015, 6 pages.
Transmittal of International Preliminary Report on Patentability from foreign counterpart PCT/US2013/077888, mailed Jul. 9, 2015, 7 pages.
Office Action from U.S. Appl. No. 14/268,733, mailed Jul. 16, 2015, 13 pages.
Notification of Transmittal of the International Search Report and the Written Opinion from counterpart Patent Cooperation Treaty Application No. PCT/US2015/028924, mailed Jul. 30, 2015, 10 pages.
Office Action from U.S. Appl. No. 14/218,575, mailed Aug. 7, 2015, 19 pages.
Final Office Action from U.S. Appl. No. 14/066,384, mailed Aug. 20, 2015, 23 pages.
Office Action from U.S. Appl. No. 14/268,619, mailed Aug. 24, 2015, 17 pages.
Notice of Allowance from U.S. Appl. No. 14/145,607, mailed Sep. 2, 2015, 19 pages.
Final Office Action from U.S. Appl. No. 14/218,551, mailed Sep. 9, 2015, 15 pages.
Notice of Allowance from U.S. Appl. No. 14/145,533, mailed Sep. 14, 2015, 13 pages.
Notice of Allowance from U.S. Appl. No. 14/448,697, mailed Sep. 15, 2015, 14 pages.
Notification of Transmittal of the International Search Report and the Written Opinion from counterpart Patent Cooperation Treaty Application No. PCT/US2015/042785, mailed Oct. 16, 2015, 8 pages.
Notification of Transmittal of the International Search Report and the Written Opinion from counterpart Patent Cooperation Treaty Application No. PCT/US2015/042799, mailed Oct. 19, 2015, 13 pages.
Office Action from U.S. Appl. No. 14/448,641, mailed Nov. 9, 2015, 21 pages.
Barker et al; "Recommendation for key management Part 3: Application-Specific Key Management Guidance"; NIST special Publication 800-57, pp. 1-103, Dec. 2009.
Office Action from U.S. Appl. No. 14/448,814, mailed Aug. 4, 2015, 13 pages.
World Wide Web Consortium, W3C Working Draft: Media Capture and Streams (2013).
Office Action from U.S. Appl. No. 14/218,692, mailed Nov. 4, 2015, 16 pages.
Notice of Allowance from U.S. Appl. No. 14/145,439, mailed Oct. 28, 2015, 12 pages.

Brickell, Ernie, Jan Camenisch, and Liqun Chen. "Direct anonymous attestation." *Proceedings of the 11th ACM conference on Computer and communications security*. ACM, 2004, 6 pages.
Chen, Liqun, and Jiangtao Li. "Flexible and scalable digital signatures in TPM 2.0." *Proceedings of the 2013 ACM SIGSAC conference on Computer & communications security*. ACM, 2013.
Chakka, Murali Mohan, et al. "Competition on counter measures to 2-d facial spoofing attacks." *Biometrics (IJCB), 2011 International Joint Conference on*. IEEE, 2011, 6 pages.
Marcialis, Gian Luca, et al. "First international fingerprint liveness detection competition—livdet 2009." *Image Analysis and Processing—ICIAP* 2009. Springer Berlin Heidelberg, 2009. 12-23.
Uludag, Umut, and Anil K. Jain. "Attacks on biometric systems: a case study in fingerprints." *Electronic Imaging 2004*. International Society for Optics and Photonics, 2004, 12 pages.
Ratha, Nalini K., Jonathan H. Connell, and Ruud M. Bolle. "An analysis of minutiae matching strength." *Audio-and Video-Based Biometric Person Authentication*. Springer Berlin Heidelberg, 2001, 7 pages.
Schneier, B., "Biometrics: Uses and Abuses". Aug. 1999. Inside Risks 110 (CACM 42, Aug. 8, 1999). http://www.schneier.com/essay-019.pdf.
Zhao, W., et al. "Face Recognition: A Literature Survey". ACM Computing Surveys, vol. 35, No. 4. Dec. 2003, pp. 399-458.
Abate, A., et al., "2D and 3D face recognition: A survey". Pattern Recognition Letters. 2007, 28, pp. 1885-1906.
GSM Arena. GSM Arena. [Online] Nov. 13, 2011. [Cited: Sep. 29, 2012.] http://www.gsmarena.com/ice_cream_sandwichs_face_unlock_duped_using_a_photograph-news-3377.php. Downloaded Aug. 18, 2015.
Wilson, R., James. Unbuntu Life, "How to Trick Google's New Face Unlock On Android 4.1 Jelly Bean". Print Screen Mac. [Online] Aug. 6, 2012. [Cited: Sep. 28, 2012.] http://printscreenmac.info/how-to-trick-android-jelly-bean-face-unlock/. downloaded Aug. 13, 2015.
Phillips, P., J., et al., "Face Recognition Vendor Test 2002: Evaluation Report". s.l.: NISTIR 6965, 2002. 56 pages. http://www.face-rec.org/vendors/FRVT_2002_Evaluation_Report.pdf.
Phillips, P.J., et al., "FRVT 2006 and ICE 2006 Large-Scale Results", NIST IR 7408. Gaithersburg: NIST, 2006. Mar. 29, 2007. pp. 1-55.
Grother, P.J., et al., NIST. Report on the Evaluation of 2D Still-Image Face Recognition Algorithms, NIST IR 7709. s.l.: NIST, 2011. Jun. 22, 2010. pp. 1-58.
Roberts, C., "Biometric Attack Vectors and Defences". Sep. 2006. 25 pages. http://otago.ourarchive.ac.nz/bitstream/handle/10523/1243/BiometricAttackVectors.pdf.
Pinto, A., et al., "Video-Based Face Spoofing Detection through Visual Rhythm Analysis". Los Alamitos: IEEE Computer Society Conference Publishing Services, 2012. Conference on Graphics, Patterns and Images, 25. 8 pages. (SIBGRAPI). http://sibgrapi.sid.inpe.br/rep/sid.inpe.br/sibgrapi/2012/07.13.21.16?mirror=sid.inpe.br/banon/2001/03.30.15.38.24&metadatarepository=sid.inpe.br/sibgrapi/2012/07.13.21.16.53.
Li, J., et al., "Live Face Detection Based on the Analysis of Fourier Spectra". Biometric Technology for Human Identification. 2004, pp. 296-303.
Tan, X., et al., "Face Liveness Detection from A Single Image with Sparse Low Rank Bilinear Discriminative Model". s.l.: European Conference on Computer Vision, 2010. pp. 1-14.
Määttä, J., et al., "Machine Vision Group, University of Oulu", Finland. "Face Spoofing Detection From Single Images Using Micro-Texture Analysis". Oulu, Finland: IEEE, 2011. pp. 1-7. http://www.ee.oulu.fi/research/mvmp/mvg/files/pdf/131.pdf.
Heikkilä, M., et al., "A Texture-Based Method for Modeling the Background and Detecting Moving Objects". Oulu: IEEE, Jun. 22, 2005. Draft. 16 pages. http://www.ee.oulu.fi/mvg/files/pdf/pdf_662.pdf.
Peng, Y., et al. "RASL: Robust Alignment by Sparse and Low-rank Decomposition for Linearly Correlated Images". IEEE Conference on Computer Vision and Pattern Recognition. 2010, pp. 763-770. http://yima.csl.illinois.edu/psfile/RASL_CVPR10.pdf.
Kong, S., et al., "Recent advances in visual and infrared face recognition"—a review. Journal of Computer Vision and Image Understanding. Jun. 2005, vol. 1, 97, pp. 103-135.

(56) References Cited

OTHER PUBLICATIONS

Kollreider, K., et al., Halmstad University, SE-30118, Sweden. Evaluating Liveness by Face Images and the Structure Tensor. Halmstad, Sweden: s.n., 2005. http://citeseerx.ist.psu.edu/viewdoc/download?doi=10.1.1.62.6534&rep=rep1&type=pdf.

Smiatacz, M., et al., Gdansk University of Technology. Liveness Measurements Using Optical Flow for Biometric Person Authentication. Metrology and Measurement Systems. 2012, vol. XIX, 2. pp. 257-268.

Bao, W., et al., et al.,"A liveness detection method for face recognition based on optical flow field". Image Analysis and Signal Processing, IASP 2009. Apr. 11-12, 2009, pp. 233-236. http://ieeexplore.ieee.org/stamp/stamp.jsp?tp=&arnumber=5054589&isnumber=5054562.

Pan, G., et al., "Liveness Detection for Face Recognition". Recent Advances in Face Recognition. Vienna: I-Tech, 2008, Ch. 9, pp. 109-124, ISBN: 978-953-7619-34-3.

National Science & Technology Council's Subcommittee on Biometrics. Biometrics Glossary. 33 pages, Last updated Sep. 14, 2006. NSTC. http://www.biometrics.gov/documents/glossary.pdf.

Ross, A., et al. "Multimodal Biometrics: An Overview". Proceedings of 12th European Signal Processing Conference (EUSIPCO). Sep. 2004, pp. 1221-1224. http://www.csee.wvu.edu/~ross/pubs/RossMultimodalOverview_EUSIPCO04.pdf.

Rodrigues, R.N., et al. Robustness of multimodal biometric fusion methods against spoof attacks. Journal of Visual Language and Computing. 2009. 11 pages, doi:10.1016/j.jvlc.2009.01.010; http://cubs.buffalo.edu/govind/papers/visual09.pdf.

Akhtar, Z., et al., "Spoof Attacks on Multimodal Biometric Systems". Alfarid. Singapore: IACSIT Press, Singapore, 2011. 2011 International Conference on Information and Network Technology IPCSIT. vol. 4. pp. 46-51. http://www.ipcsit.com/vol4/9-ICINT2011T046.pdf.

Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] http://eyetools.com/articles/p3-understanding-eye-tracking-what-is-a-heatmap-really.

Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.

Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.

Lubin, G., et al., Business Insider. "16 Heatmaps That Reveal Exactly Where People Look". [Online] May 21, 2012. [Cited: Nov. 1, 2012.] pp. 1-21. http://www.businessinsider.com/eye-tracking-heatmaps-2012-5?op=1.

Huang, L., et al., "Clickjacking: Attacks and Defenses". s.l.: Usenix Security 2012, pp. 1-16, 2012. https://www.usenix.org/system/files/conference/usenixsecurity12/sec12-final39.pdf.

Willis, N., Linux.com. Weekend Project: Take a Tour of Open Source Eye-Tracking Software. [Online] Mar. 2, 2012. [Cited: Nov. 1, 2012.] https://www.linux.com/learn/tutorials/550880-weekend-project-take-a-tour-of-open-source-eye-tracking-software.

Chetty, G. School of ISE, University of Canberra, Australia. "Multi-level liveness verification for face-voice biometric authentication". BYSM-2006 Symposium. Baltimore: BYSM-Symposium, 9 pages. Sep. 19, 2006. http://www.biometrics.org/bc2006/presentations/Tues_Sep_19/BSYM/19_Chetty_research.pdf.

Tresadern, P., et al., "Mobile Biometrics (MoBio): Joint Face and Voice Verification for a Mobile Platform". 2012. http://personal.ee.surrey.ac.uk/Personal/Norman.Poh/data/tresadern_PervComp2012_draft.pdf.

Jafri, R., et al., "A Survey of Face Recognition Techniques. Journal of Information Processing Systems", vol. 5, No. 2, Jun. 2009. vol. 5, 2, pp. 41-68. http://www.cosy.sbg.ac.at/~uhl/face_recognition.pdf.

Himanshu, et al., "A Review of Face Recognition". International Journal of Research in Engineering & Applied Sciences. Feb. 2012, vol. 2, 2, pp. 835-846. http://euroasiapub.org/IJREAS/Feb2012/81.pdf.

Phillips, P. J., et al., "Biometric Image Processing and Recognition". Chellappa. 1998. Eusipco. 8 pages.

Zhou, et al., "Face Recognition from Still Images and Videos". University of Maryland, College Park, MD 20742. Maryland: s.n., Nov. 5, 2004. pp. 1-23, http://citeseerx.ist.psu.edu/viewdoc/download-?doi=10.1.1.77.1312&rep=rep1&type=pdf.

Quinn, G.W., et al., NIST. "Performance of Face Recognition Algorithms on Compressed Images", NIST Inter Agency Report 7830. s.l.: NIST, Dec. 4, 2011.

The Extended M2VTS Database. [Online] [Cited: Sep. 29, 2012.] downloaded Jan. 28, 2015, 1 page; http://www.ee.surrey.ac.uk/CVSSP/xm2vtsdb/.

Ratha, N. K., et al., IBM. "Enhancing security and privacy in biometrics-based authentication systems". IBM Systems Journal. 2001, vol. 40, 3. pp. 614-634.

Schuckers, S., Schuckers SAC. "Spoofing and Anti-Spoofing Measures". Information Security Technical Report. Dec. 10, 2002, vol. 7, 4., pp. 56-62.

Schwartz, W., et al., "Face Spoofing Detection through Partial Least Squares and Low-Level Descriptors". s.l.: Intl. Joint Conference on Biometrics,. 2011. pp. 1-8.

Edited by Kresimir Delac, Mislav Grgic and Marian Stewart Bartlett. s.l.: InTech, Jun. 1, 2008. http://cdn.intechopen.com/finals/81/InTech-Recent_advances_in_face_recognition.zip. ISBN 978-953-7619-34-3. Uploaded as Chapters 1-15.

Pan, G., et al., "Monocular camera-based face liveness detection by combining eyeblink and scene context" pp. 215-225. s.l.: Springer Science+Business Media, LLC, Aug. 4, 2010. http://www.cs.zju.edu.cn/~gpan/publication/2011-TeleSys-liveness.pdf.

Tronci, R, et al., "Fusion of multiple clues for photo-attack detection in face recognition systems". 09010 Pula (CA), Italy: s.n., 2011. pp. 1-6. http://prag.diee.unica.it/pra/system/files/Amilab_IJCB2011.pdf.

Rocha, A., et al., "Vision of the Unseen: Current Trends and Challenges in Digital Image and Video Forensics". s.l.: ACM Computing Surveys, 2010. http://www.wjscheirer.com/papers/wjs_csur2011_forensics.pdf.

Linux.com, The source for Linux information. 2012. 3 pages, downloaded Jan. 28, 2015.

Kollreider, K., et al., "Non-instrusive liveness detection by face images". Image Vis. Comput. (2007). doi:10.1016/j.imavis.2007.05.004, Received Feb. 18, 2006, received in revised form, Jan. 24, 2007 and accepted May 22, 2007. 12 pages.

Notification of Transmittal of the International Search Report and the Written Opinion from counterpart Patent Cooperation Treaty Application No. PCT/US2015/042870, mailed Oct. 30, 2015, 9 pages.

Notification of Transmittal of the International Search Report and the Written Opinion from counterpart Patent Cooperation Treaty Application No. PCT/US2015/42827, mailed Oct. 30, 2015, 9 pages.

Validity, OSTP Framework, 24 pages, 2010.

Notification of Transmittal of the International Search Report and the Written Opinion from counterpart Patent Cooperation Treaty Application No. PCT/US15/50348, mailed Dec. 22, 2015, 9 pages.

Office Action from U.S. Appl. No. 14/448,868, mailed Dec. 3, 2015, 15 pages.

Office Action from U.S. Appl. No. 14/487,992, mailed Dec. 31, 2015, 12 pages.

Final Office Action from U.S. Appl. No. 14/268,619, mailed Dec. 14, 2015, 10 pages.

Notification of Transmittal of International Search Report and Written Opinion from PCT/US2015/028927, mailed Jul. 30, 2015, 12 pages.

Transmittal of International Preliminary Report On Patentability from foreign counterpart PCT Patent Application No. PCT/US2014/039627 mailed Dec. 10, 2015, 8 pages.

Notice of Allowance from U.S. Appl. No. 14/448,697, mailed Jan. 14, 2016, 23 pages.

Final Office Action from U.S. Appl. No. 14/268,733, mailed Jan. 15, 2016, 14 pages.

(56) References Cited

OTHER PUBLICATIONS

Notice of Allowance from U.S. Appl. No. 14/145,533, mailed Jan. 20, 2016, 12 pages.
Office Action from U.S. Appl. No. 14/218,743, mailed Jan. 21, 2016, 12 pages.
Office Action from U.S. Appl. No. 14/218,551, mailed Jan. 21, 2016, 11 pages.
Office Action from U.S. Appl. No. 14/218,575, mailed Jan. 29, 2016, 25 pages.
Niinuma, Koichiro, and Anil K. Jain. "Continuous user authentication using temporal information." *SPIE Defense, Security, and Sensing*. International Society for Optics and Photonics, 2010. (currently at http://www.cse.msu.edu/biometrics/Publications/Face/NiinumaJain_ContinuousAuth_SPIE10.pdf).
Office Action from U.S. Appl. No. 14/218,551, mailed May 12, 2016, 11 pages.
Office Action from U.S. Appl. No. 14/448,868, mailed May 12, 2016, 11 pages.
Final Office Action from U.S. Appl. No. 14/448,814, mailed Jun. 14, 2016, 17 pages.
Office Action from U.S. Appl. No. 14/066,273, mailed Jun. 16, 2016, 43 pages.
Notice of Allowance from U.S. Appl. No. 14/448,641, mailed Jun. 7, 2016, 13 pages.
Office Action from U.S. Appl. No. 14/218,611, mailed Jun. 16, 2016, 13 pages.

\* cited by examiner

SYSTEM AND METHOD FOR AUTHORIZING A NEW AUTHENTICATOR

BACKGROUND

1. Field of the Invention

This invention relates generally to the field of data processing systems. More particularly, the invention relates to a system and method for authorizing a new authenticator.

2. Description of Related Art

FIG. 1 illustrates an exemplary client 120 with a biometric device 100. When operated normally, a biometric sensor 102 reads raw biometric data from the user (e.g., capture the user's fingerprint, record the user's voice, snap a photo of the user, etc) and a feature extraction module 103 extracts specified characteristics of the raw biometric data (e.g., focusing on certain regions of the fingerprint, certain facial features, etc). A matcher module 104 compares the extracted features 133 with biometric reference data 110 stored in a secure storage on the client 120 and generates a score based on the similarity between the extracted features and the biometric reference data 110. The biometric reference data 110 is typically the result of an enrollment process in which the user enrolls a fingerprint, voice sample, image or other biometric data with the device 100. An application 105 may then use the score to determine whether the authentication was successful (e.g., if the score is above a certain specified threshold).

While the system shown in FIG. 1 is oriented towards biometric authentication, various other or additional authentication techniques may be employed on the exemplary client 120. For example, the client-side authenticators may be based on a PIN or other secret code (e.g., a password) entered by the user and/or may be triggered based on user presence (e.g., a button that user pushes to verify presence).

Systems have been designed for providing secure user authentication over a network using biometric sensors. In such systems, the score generated by the application, and/or other authentication data, may be sent over a network to authenticate the user with a remote server. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of US Patent Applications ("Co-pending Applications"), all filed Dec. 29, 1012, which are assigned to the present assignee and incorporated herein by reference: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework.

Briefly, the Co-Pending Applications describe authentication techniques in which a user enrolls with authentication devices (or Authenticators) such as biometric devices (e.g., fingerprint sensors) on a client device. When a user enrolls with a biometric device, biometric reference data is captured (e.g., by swiping a finger, snapping a picture, recording a voice, etc). The user may subsequently register the authentication devices with one or more servers over a network (e.g., Websites or other relying parties equipped with secure transaction services as described in the Co-Pending Applications); and subsequently authenticate with those servers using data exchanged during the registration process (e.g., cryptographic keys provisioned into the authentication devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's authentication device to protect a user's privacy.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1:
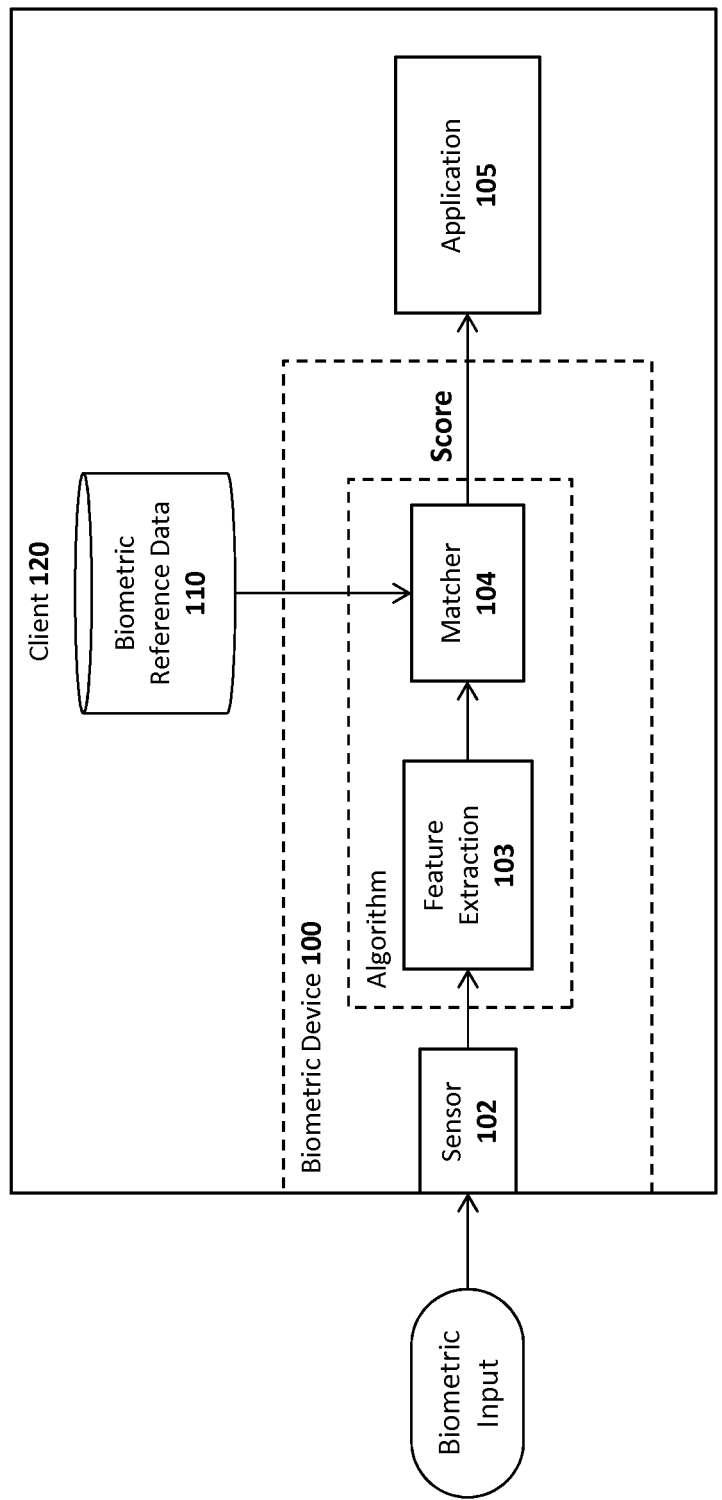
FIG. 1 illustrates an exemplary client equipped with a biometric device.

Described below are embodiments of an apparatus, method, and machine-readable medium for authorizing a new authenticator. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve authentication devices with user verification capabilities such as biometric modalities or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The user verification capabilities may also include non-biometric modalities, like PIN entry. The authenticators might use devices like trusted platform modules (TPMs), smartcards and secure elements for cryptographic operations and key storage.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication strength and integrity protection) and/or whether a hacker has compromised or even replaced the biometric device. Confidence in the biometric device depends on the particular implementation of the device.

The term "relying party" is sometimes used herein to refer, not merely to the entity with which a user transaction is attempted (e.g., a Website or online service performing user transactions), but also to the secure transaction servers implemented on behalf of that entity which may performed the underlying authentication techniques described herein. The secure transaction servers may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

System and Method for Authorizing a New Authenticator

In some instances, it may be useful to allow a new authenticator to be enabled using registered authenticators on existing client devices. For example, if the user purchases a new device with a new set of authenticators, it would be beneficial to provide the user with a way to automatically register all of the new authenticators using the existing authenticators.

The embodiments of the invention described below allow a user to authorize the authenticator(s) on a new client device using an existing/old, trusted client device that is registered with one or more relying parties. In particular, these embodiments may be used to enable new authenticators on new or existing client devices and keep the registrations in sync between multiple client devices.

Figure 2:
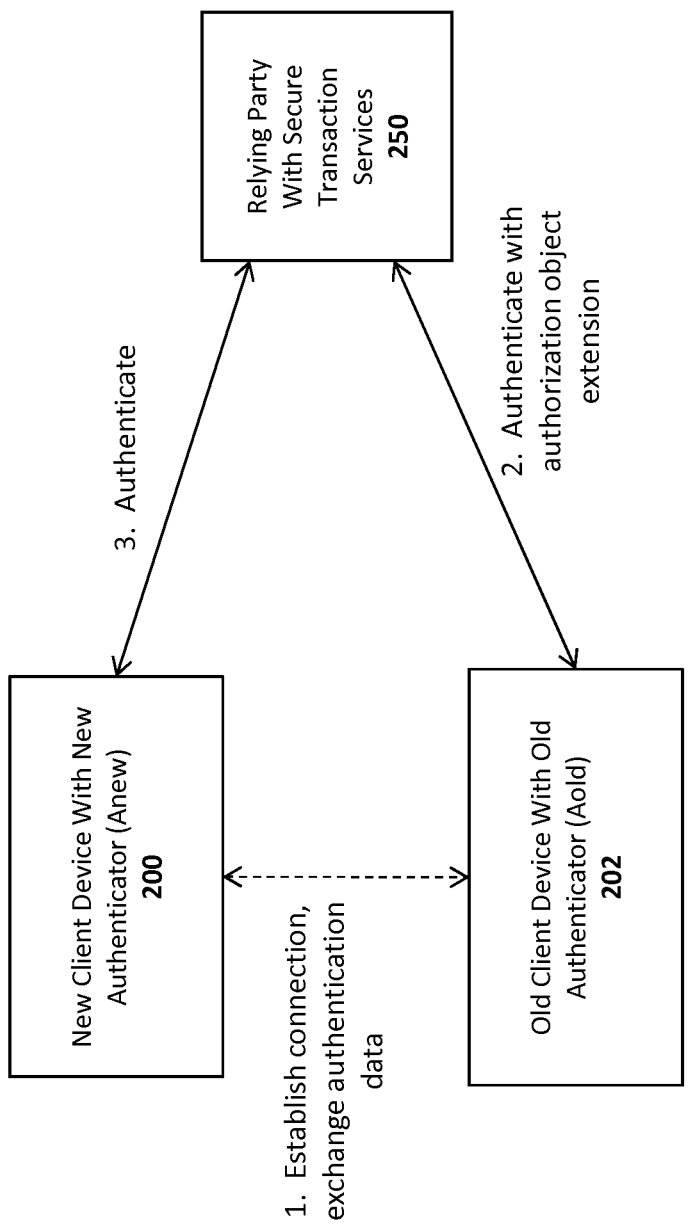
FIG. 2 illustrates one embodiment of a system for authorizing a new authenticator with a relying party.

FIG. 2 provides a high level overview of authenticator authorization in accordance with one embodiment of the invention. A client device with an old/existing authenticator (Aold) 202 (i.e., a device which has an authenticator which is registered with one or more relying parties 250), establishes a connection with the user's new client device 200. The particular manner in which the connection is established is not pertinent to the underlying principles of the invention. In one embodiment, the connection comprises a secure/encrypted connection (e.g., established via SSL, TLS, etc). Various techniques may be used such as near field communication (NFC), Bluetooth, Wifi Direct, using a quick response (QR) code and establishing an HTTPS connection, or over a standard network connection (e.g., via WiFi or Ethernet).

In one embodiment, once the connection is established between the client with Aold 202 and the client with Anew 200, a secure protocol is implemented (described in detail below) to transfer and integrate the registration data from the old/existing client 202 to the new client 200. For example, in one embodiment, the old client 202 sends registration data to the new client 200 which then generates a new set of key pairs (e.g., one for each relying party) and sends the public keys back to the old client 202 along with an indication of the types of authenticators on the new client 200. The client with Aold then generates a signed authorization object (e.g., using the public keys, authenticator identification data, and user account data) which it sends to each respective relying party 250.

Figure 3:
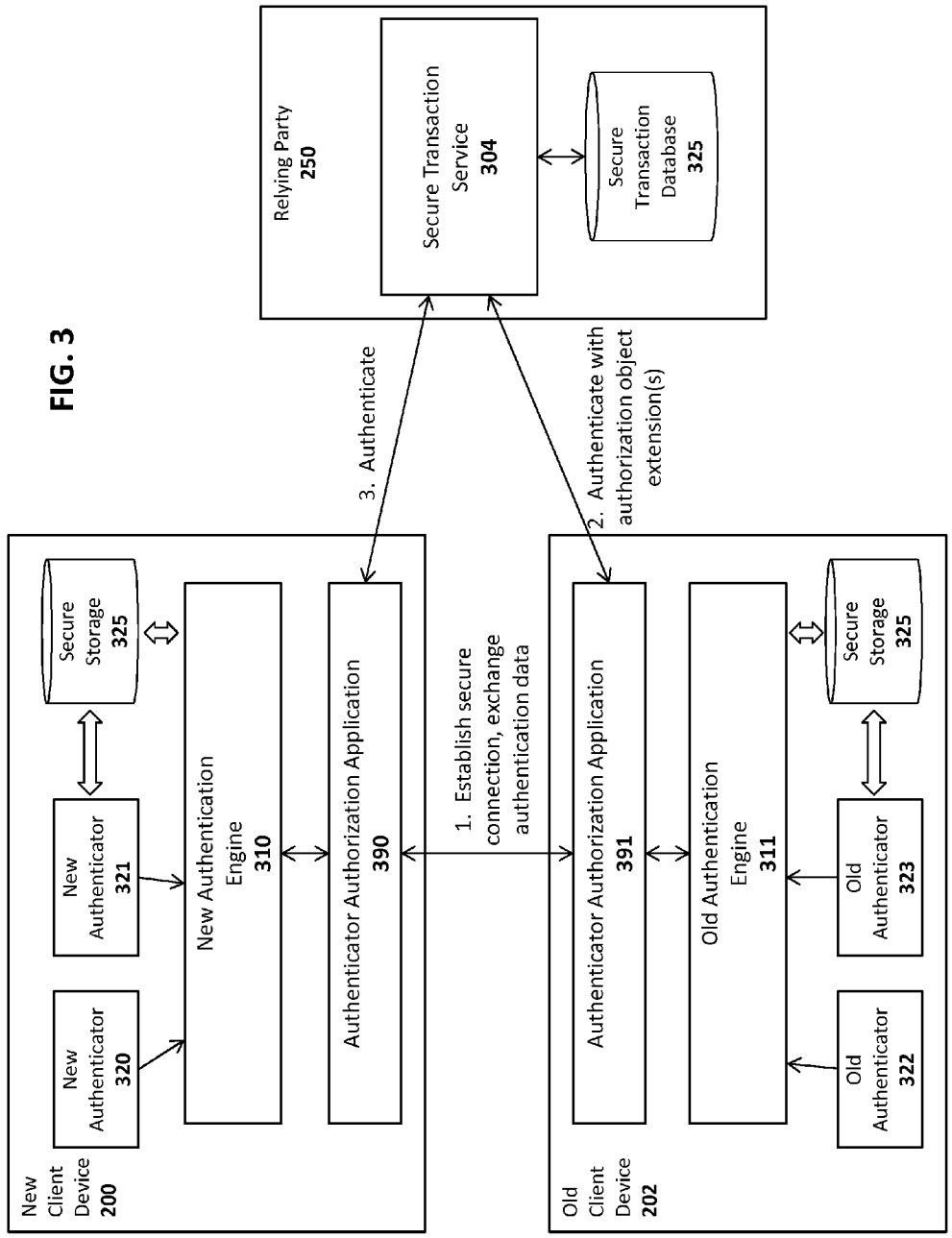
FIG. 3 illustrates additional details of one embodiment of a system for authorizing a new authenticator with a relying party.

As illustrated in FIG. 3, an authenticator authorization application 390, 391 may be executed on the new device 200 and old device 202, respectively, to establish the secure connection, exchange the authorization data, and verify the registrations with a secure transaction service 304 on each relying party 250. As used herein, an "old authenticator" (Aold) is an authenticator that a user has already registered with one or more relying parties. A "new authenticator" (Anew) is one which the user wishes to enable with all the relying party registrations currently being used with the old authenticator. Thus, the authentication engine 311 in the described embodiments has previously registered one or more old authentication devices 322-323 with a relying party. The goal of one embodiment is to transfer registrations from the old authentication engine 311 to the new authentication engine 310 to enable the new authenticators 320-321 with each relying party.

As illustrated the new client 200 and the old client 202 both include secure storage 325 and 326, respectively, for storing the registration data for each relying party (e.g., public/private key pairs used during authentication). In addition, the relying party 250 includes a secure transaction database 325 for securely storing registration data for each of the client devices 200-202 (e.g., user account data, authenticator identification data, public keys provided by for each authenticator, etc).

In one embodiment, the user initiates the authenticator authorization application 390 on the new client device 200 and the authenticator authorization application 390 on the old client device 202 to establish the initial secure connection. The authenticator authorization applications 390-391 may be mobile device apps or applications specifically designed to perform the authorization operations described herein. In another embodiment, the authenticator authorization applications may be browser plugins executed in response to the user indicating that he/she wishes to perform authorization (e.g., via a web page with embedded Javascript or other applet or executable program code). Moreover, the authenticator authorization applications 390-391 may be software modules within a larger application such as an authentication application designed to manage authentications with relying parties. It should be noted, however, that the underlying principles of the invention are not limited to any particular implementation of the authenticator authorization applications 390-391.

In one embodiment, to approve the authorization operations on the old device 202, the user is verified by the authentication engine 311 on the old device (e.g., providing biometric input to a user authentication device 322-323). Similarly, in one embodiment, the user may be verified by the authentication engine 310 on the new client device 200. These two verification steps may provide authorization for the authenticator authorization applications 390-391 to perform the authorization process.

As mentioned, at the start of the authorization process, the authenticator authorization applications 390-391 establish a secure connection (e.g., using Bluetooth, WiFi, etc). In one embodiment, the authenticator authorization application 390 on the new client device 200 receives a set of registration data for each relying party with which the old client device 202 is registered. The registration data may include usernames and a unique code associated with the user's account on each relying party. This unique code associating the user with each relying party is sometimes referred to herein as an "AppID." In some embodiments, where a relying party offers multiple online services, a user may have multiple AppIDs with a single relying party (one for each service offered by the relying party).

In one embodiment, the authenticator authorization application 390 on the new client 200 then generates a new public/private key pair for each relying party (e.g., one for each Username+AppID pair). The authenticator authorization application 390 on the new client 200 sends the authenticator authorization application 391 on the old client 202 the key pair (or just the public key) along with an authenticator ID identifying each new authenticator type (e.g., an Authenticator Attestation ID or "AAID"). The user may then be prompted to confirm the authorization of the new authenticator(s).

In one embodiment, the authenticator authorization application 391 generates a signed authorization object comprising a signature over the tuple of the AAID, the public key and the AppID for each relying party. In one embodiment, the signature is generated using the current authentication key associated with the relying party (e.g., a private key associated with the old authenticator for the relying party). The authenticator authorization application 391 then authenticates to each of the relying parties (e.g., via the old authentication engine 311 and one or more old authenticators 322-323) and includes the signed authorization object as an extension to one of the authentication messages.

Upon receiving the signed authentication message, the secure transaction service 304 may then verify the signature (e.g., using the public key corresponding to the private key used to generate the signature). Once verified, it may identify the user's account with the AppID and store the new AAID and the new public key for the new authenticator(s) within the secure transaction database 325. The user may subsequently authenticate using the new authenticators 320-321 without re-registering with each relying party 250.

Although illustrated in FIGS. 2-3 as a new user device, the underlying principles of the invention may also be implemented in a scenario where a user installs a new authenticator on an existing client device. For example, the user may upgrade or add an authenticator to an existing desktop, notebook or other type of client. In such a case, the communication of between the authenticator authorization applications 390-391 shown in FIG. 3 may occur internally (e.g., via internal function calls between software modules implemented on the client).

Figure 4:
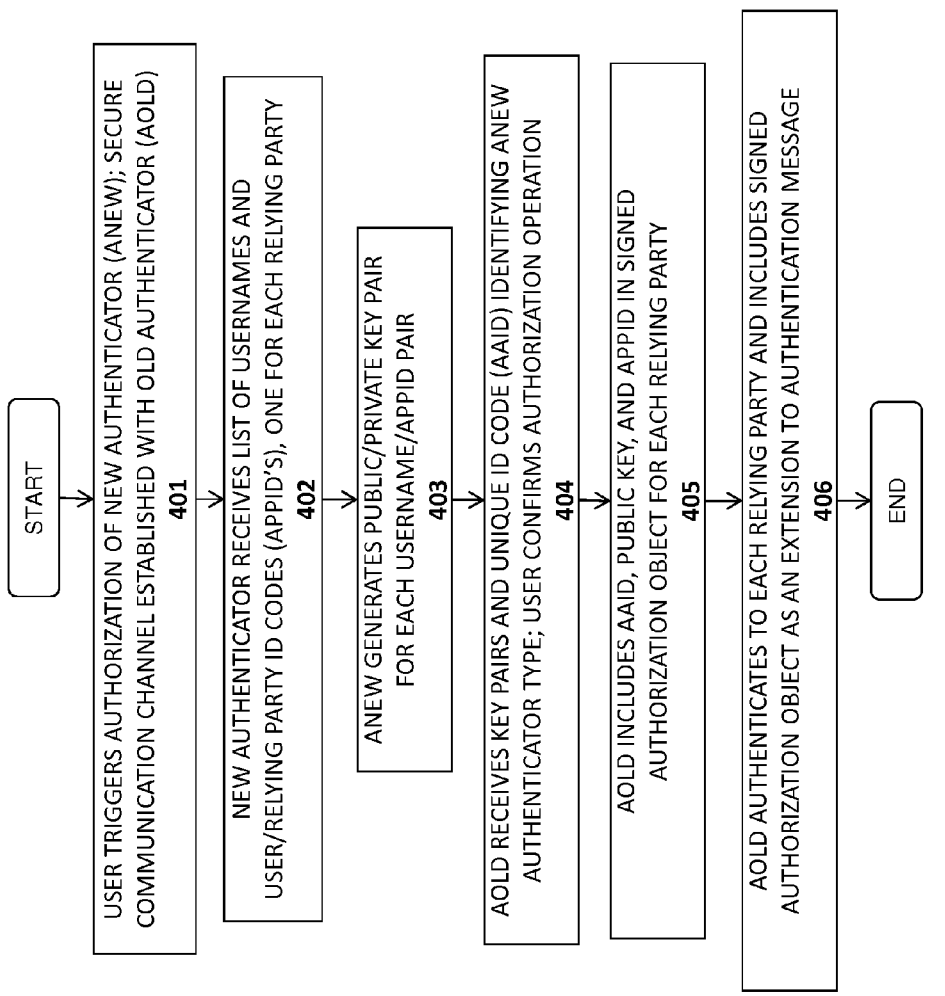
FIG. 4 illustrates one embodiment of a method for authorizing a new authenticator with a relying party.

One embodiment of a method for authorizing a new authenticator is illustrated in FIG. 4. The method may be implemented within the context of a system such as shown in FIG. 3, but is not limited to any particular system architecture.

At 401, the user triggers the authorization of one or more new authenticators (Anew) and establishes a secure communication channel with the old authenticator(s) (Aold). As mentioned, the secure communication channel may be established via a direct connection (e.g., via NFC, Bluetooth, etc) or over a network (e.g., via an Ethernet or WiFi connection).

At 402, the new authenticator receives a username and user/relying party ID code for each relying party.

At 403, the new authenticator generates a public/private key pair for each username/AppID pair (e.g., for each unique relying party account).

At 404, the old authenticator receives the key pairs and an authenticator attestation ID code identifying the type of each new authenticator (e.g., an AAID). The user may then be asked to confirm the authorization operation.

At 405, the old authenticator generates a signed authorization object comprising a signature over the tuple of the AAID, the public key and the AppID for each relying party. As mentioned, the signature may be generated using the current authentication key associated with the relying party (e.g., a private key associated with the old authenticator for the relying party).

At 406, the old authenticator authenticates to each relying party and includes the signed authorization object as an extension to the authentication message. Once this operation is successfully completed, the user may then authenticate with each relying party using the new device and/or new authenticators.

Figure 5:
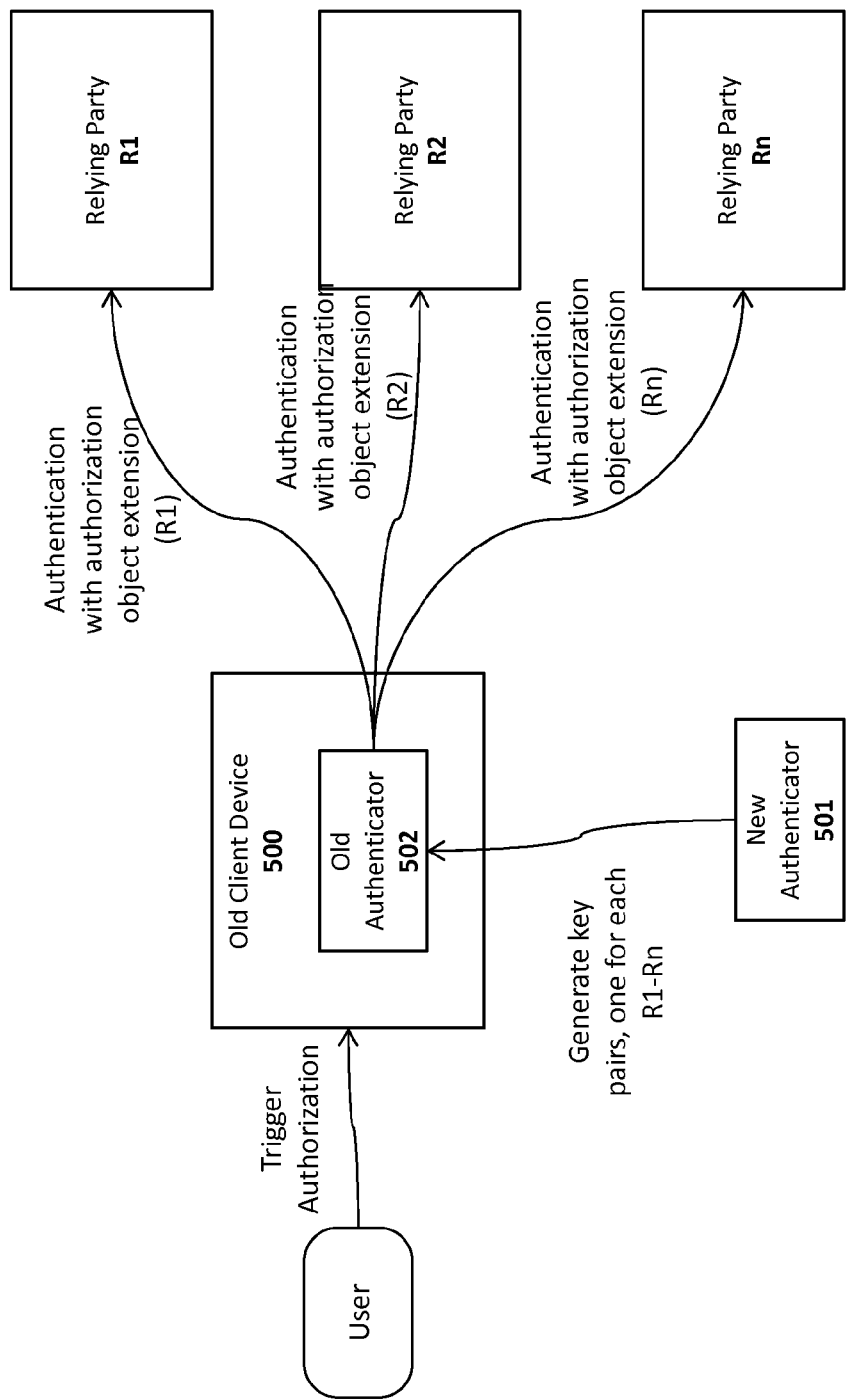
FIG. 5 illustrates a one embodiment in which an old authenticator authorizes a new authenticator with a plurality of relying parties.

FIG. 5 graphically illustrates a sequence of operations in which a new authenticator 501 is authorized for use with a plurality of relying parties R1-Rn using an old authenticator 502 on an old client 500. As mentioned, after receiving account data related to each of the relying parties, the new authenticator 501 generates new key pairs for each of the relying parties R1-Rn and provides the new key pairs to the old authenticator 502. The old authenticator 502 then generates a secure authorization object containing data related to the new authenticator 501 (e.g., the AAID) and a new key for each authenticator. It then performs authentication with each of the relying parties R1-Rn and includes the authentication object. Following verification (e.g., in which a signature on the authorization object is verified), the new authenticator 501 is automatically registered at each relying party R1-Rn.

In one embodiment, each relying party R1-Rn can choose whether or not to accept the new authenticator 501. For example, if the AAID indicates an authenticator type which is not sufficiently reliable or accurate, then the relying party may choose to deny the new registration. Thus, each relying party may maintain an authenticator database (i.e., Metadata) containing data for all known authenticators (e.g., identified by AAID). It may then query the database in response to receiving the authorization object from the old authenticator, determine the characteristics of the new authenticator, and determine whether those characteristics are acceptable.

Figure 6:
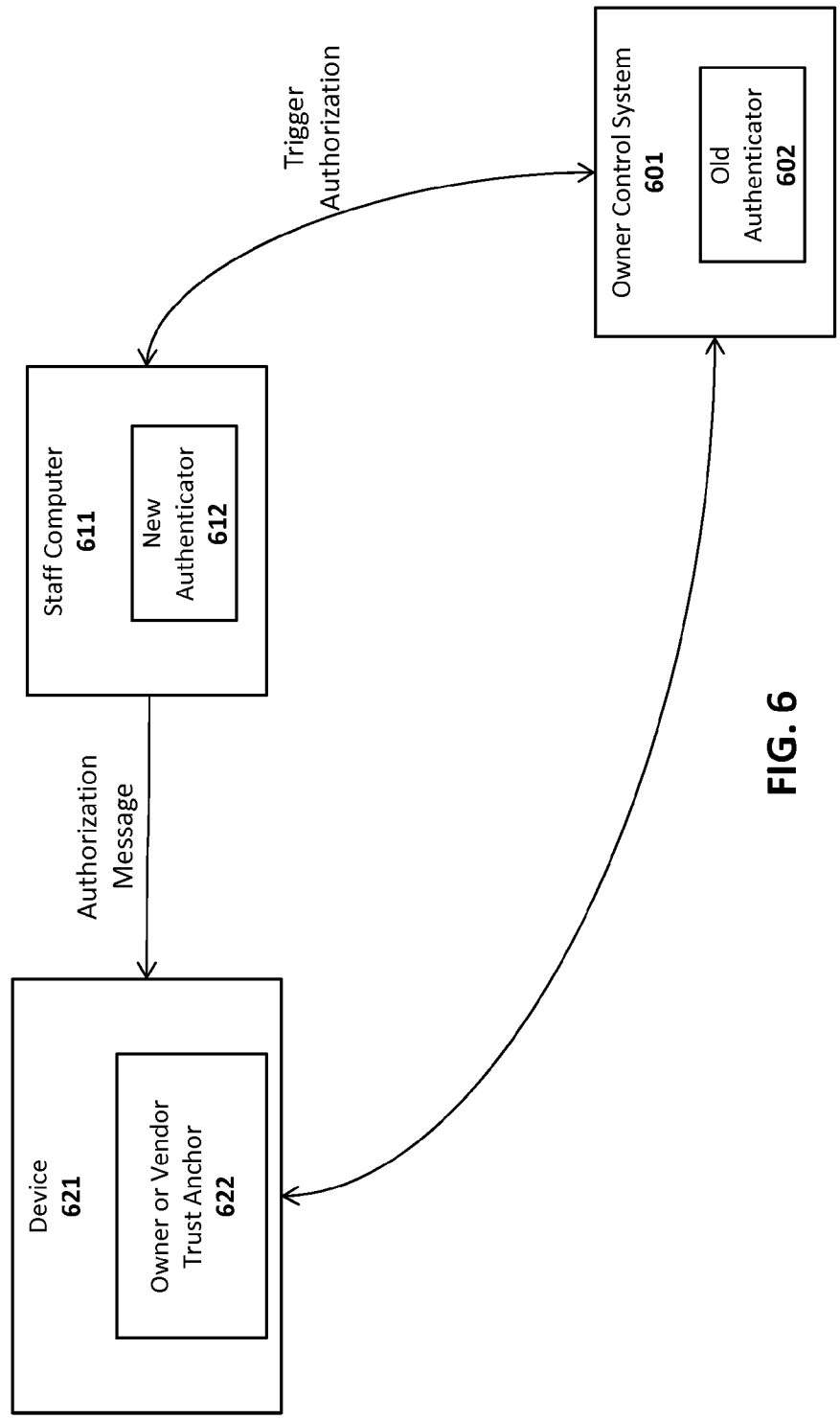
FIG. 6 illustrates one particular embodiment in which a control system controls authorization of new authenticators within an organization.

In one embodiment of the invention, an authenticator can specify a more generic "confirmation" method, where the authenticators may be indirectly controlled by the same entity, but still belong to different users. For example, in FIG. 6, the old authenticator 601 might be integrated into an Owner Control System 601 controlled by a single owner/operator (e.g., a corporation or government entity). The new authenticator 612 in this example may be authenticator belonging to a staff computer 611 and authorization of the new authenticator 612 may be trigger by the owner control system 601 using a known trusted authenticator 602. In this example, the interactions between the new authenticator 612 and old authenticator 602 may be as described above (e.g., the new authenticator generating new key pairs and the old authenticator sending an authorization object to a device 621 comprising an owner or vendor trust anchor 622 (e.g., for storing authenticator registration data as does the secure transaction database 325 of the secure transaction service 304 in FIG. 3).

Exemplary System Architectures

It should be noted that the term "relying party" is used herein to refer, not merely to the entity with which a user transaction is attempted (e.g., a Website or online service performing user transactions), but also to the secure transaction servers implemented on behalf of that entity which may perform the underlying authentication techniques described herein. The secure transaction servers may be owned and/or under the control of the relying party or may be under the control of a third party offering secure transaction services to the relying party as part of a business arrangement. These distinctions are indicated in FIGS. 7A-B discussed below which show that the "relying party" may include Websites 731 and other network services 751 as well as the secure transaction servers 732-733 for performing the authentication techniques on behalf of the websites and network services.

Figure 7A:
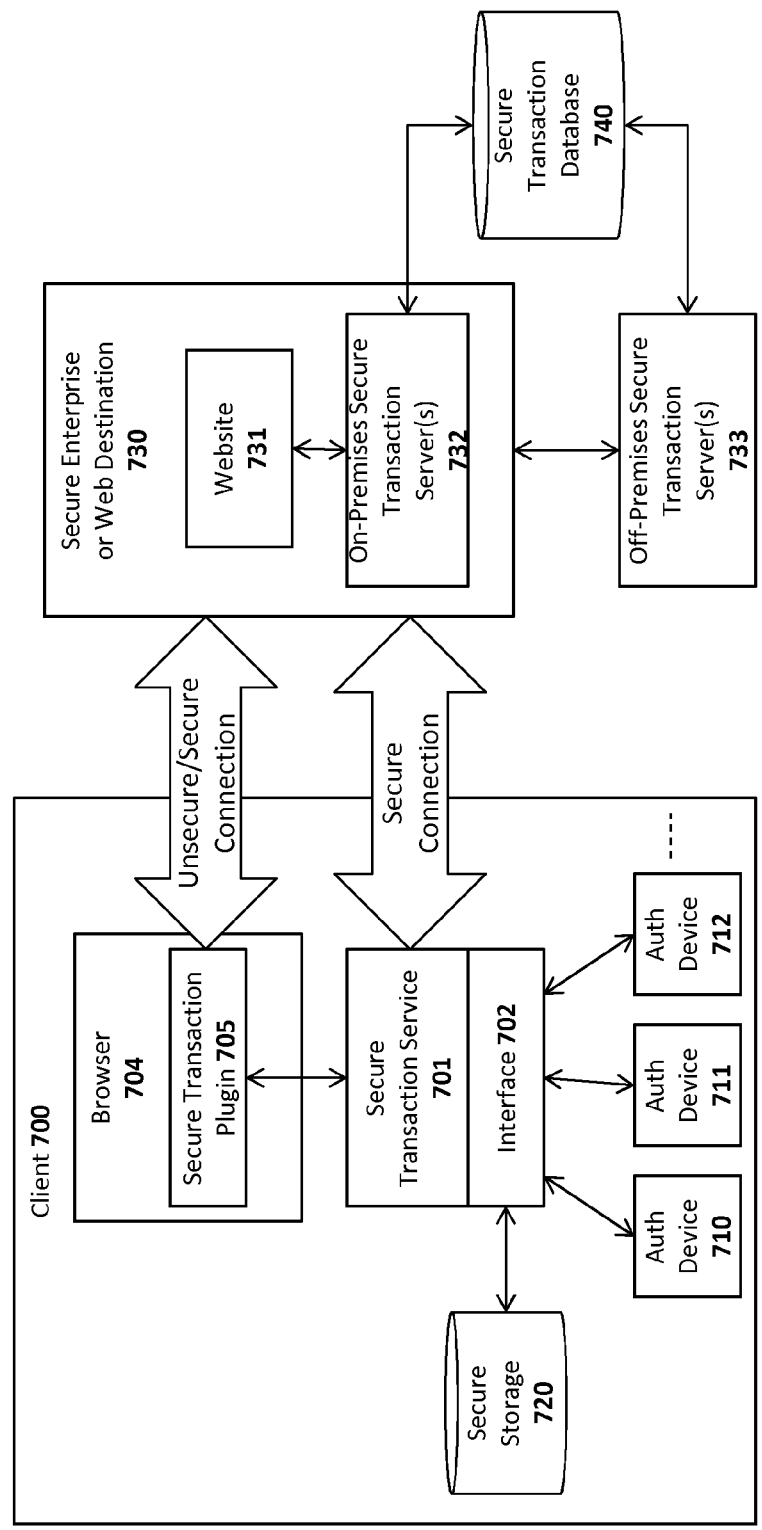
FIGS. 7A-B illustrate exemplary system architectures on which the embodiments of the invention may be implemented.
Figure 7B:
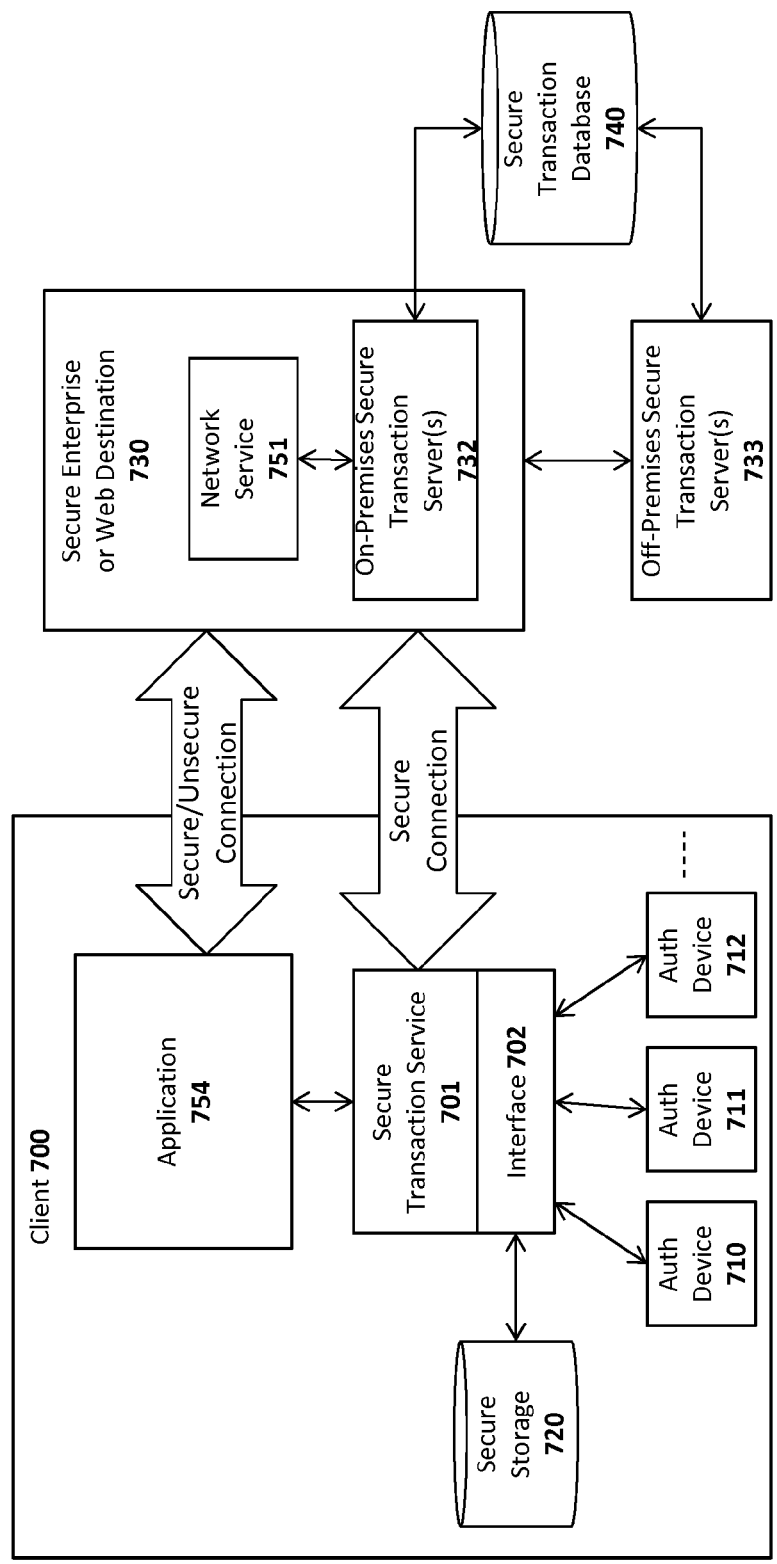

In particular, FIGS. 7A-B illustrate two embodiments of a system architecture comprising client-side and server-side components for authenticating a user. The embodiment shown in FIG. 7A uses a browser plugin-based architecture for communicating with a website while the embodiment shown in FIG. 7B does not require a browser. The various user confirmation and authorization techniques described herein may be employed on either of these system architectures. For example, the authentication engines 310, 311 and authenticator authorization applications 390, 391 may be implemented as part of the secure transaction service 701 including interface 702. It should be noted, however, that the embodiments described above may be implemented using logical arrangements of hardware and software other than those shown in FIGS. 7A-B.

Turning to FIG. 7A, the illustrated embodiment includes a client 700 equipped with one or more authentication devices 710-712 for enrolling and authenticating an end user. As mentioned above, the authentication devices 710-712 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards. A user may enroll to the biometric devices by providing biometric data (e.g., swiping a finger on the fingerprint device) which the secure transaction service 701 may store as biometric template data in secure storage 720 (via interface 702).

While the secure storage 720 is illustrated outside of the secure perimeter of the authentication device(s) 710-712, in one embodiment, each authentication device 710-712 may have its own integrated secure storage. Additionally, each authentication device 710-712 may cryptographically protect the biometric reference data records (e.g., wrapping them using a symmetric key to make the storage 720 secure).

The authentication devices 710-712 are communicatively coupled to the client through an interface 702 (e.g., an application programming interface or API) exposed by a secure transaction service 701. The secure transaction service 701 is a secure application for communicating with one or more secure transaction servers 732 over a network and for interfacing with a secure transaction plugin 705 executed within the context of a web browser 704. As illustrated, the Interface 702 may also provide secure access to a secure storage device 720 on the client 700 which stores information related to each of the authentication devices 710-712 such as a device identification code, user identification code, user enrollment data (e.g., scanned fingerprint or other biometric data), and keys used to perform the secure authentication techniques described herein. For example, as discussed in detail below, a unique key may be stored into each of the authentication devices during registration and used when communicating to servers 730 over a network such as the Internet.

Once the user has enrolled with an authentication device on the client 700, the secure transaction service 701 may register the authentication device with the secure transaction servers 732-733 over the network (e.g., using the registration techniques described herein) and subsequently authenticate with those servers using data exchanged during the registration process (e.g., encryption keys provisioned into the biometric devices). The authentication process may include any of the authentication techniques described herein (e.g., generating an assurance level on the client 700 based on explicit or non-intrusive authentication techniques and transmitting the results to the secure transaction servers 732-733).

As discussed below, certain types of network transactions are supported by the secure transaction plugin 705 such as HTTP or HTTPS transactions with websites 731 or other servers. In one embodiment, the secure transaction plugin is initiated in response to specific HTML tags inserted into the HTML code of a web page by the web server 731 within the secure enterprise or Web destination 730 (sometimes simply referred to below as "server 730"). In response to detecting such a tag, the secure transaction plugin 705 may forward transactions to the secure transaction service 701 for processing. In addition, for certain types of transactions (e.g., such as secure key exchange) the secure transaction service 701 may open a direct communication channel with the on-premises transaction server 732 (i.e., co-located with the website) or with an off-premises transaction server 733.

The secure transaction servers 732-733 are coupled to a secure transaction database 740 for storing user data, authentication device data, keys and other secure information needed to support the secure authentication transactions described below. It should be noted, however, that the underlying principles of the invention do not require the separation of logical components within the secure enterprise or web destination 730 shown in FIG. 7A. For example, the website 731 and the secure transaction servers 732-733 may be implemented within a single physical server or separate physical servers. Moreover, the website 731 and transaction servers 732-733 may be implemented within an integrated software module executed on one or more servers for performing the functions described below.

As mentioned above, the underlying principles of the invention are not limited to a browser-based architecture shown in FIG. 7A. FIG. 7B illustrates an alternate implementation in which a stand-alone application 754 utilizes the functionality provided by the secure transaction service 701 to authenticate a user over a network. In one embodiment, the application 754 is designed to establish communication sessions with one or more network services 751 which rely on the secure transaction servers 732-733 for performing the user/client authentication techniques described in detail below.

In either of the embodiments shown in FIGS. 7A-B, the secure transaction servers 732-733 may generate the keys which are then securely transmitted to the secure transaction service 701 and stored into the authentication devices within the secure storage 720. Additionally, the secure transaction servers 732-733 manage the secure transaction database 740 on the server side.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

I claim:

1. A method for authorizing a new authenticator comprising:
   identifying a plurality of relying parties with which an old authenticator is registered;
   generating at least one key for each of the plurality of relying parties;
   authenticating with each of the relying parties using a client having the old authenticator configured thereon, the client authorizing the new authenticator by providing an authorization object to each relying party comprising the at least one key, data identifying the new authenticator, and cryptographic data to be used by the relying party to verify the authorization object;
   wherein, in response to verifying the authorization object, each relying party registers the new authenticator;
   wherein an operation of generating at least one key is performed by the new authenticator;
   wherein identifying the plurality of relying parties comprises the new authenticator receiving a list of usernames and unique identification codes to identify each relying party from the old authenticator; and
   establishing a secure communication channel between the old authenticator and the new authenticator, wherein the new authenticator receives the list of usernames and unique identification codes to identify each relying party from the old authenticator over the secure communication channel.

2. The method as in claim 1 wherein the data identifying the new authenticator comprises an Authenticator Attestation ID (AAID).

3. The method as in claim 1, wherein the authorization object further comprises a first unique identification code identifying the relying party's service.

4. The method as in claim 1 wherein the authorization object further comprises a Username or UserID identifying a user account at each relying party.

5. The method as in claim 4 wherein generating at least one key comprises generating a public/private key pair for each relying party and wherein the public key of the key pair is provided in the authorization object to the relying party.

6. The method as in claim 1 wherein the cryptographic data comprises a signature generating using a private key of the old authenticator.

7. The method as in claim 6 wherein the signature is generated over contents of the authorization object.

8. The method as in claim 1 wherein generating at least one key comprises the new authenticator generating a public/private key pair for each pair of the username and unique identification codes to identify each relying party.

9. The method as in claim 1 wherein the old authenticator is configured within a control system managed by an organization, the new authenticator is configured within a staff computer of the organization, and the relying party comprises a trust anchor managed by the organization.

10. The method as in claim 1 wherein the secure communication channel comprises a Bluetooth channel, Near Field Communication channel, WiFi channel, or Ethernet channel.

11. The method as in claim 1 wherein the old authenticator (Aold) displays the unique identification code for a first relying party and a public key hash of the key on a secure display used for transaction confirmation operations and wherein the new authenticator (Anew) displays the public key hash derived from a public key extracted from an authenticated message received from Aold and also displays the unique identification code for the first relying part and the public key hash on its secure display, thereby allowing the user to verify the correctness of the operation even in the case of compromised client devices.

12. A non-transitory machine-readable medium having program code stored thereon which, when executed by one or more computing devices, causes the one or more computing devices to perform the operations of:
   identifying a plurality of relying parties with which an old authenticator is registered;
   generating at least one key for each of the plurality of relying parties;
   authenticating with each of the relying parties using a client having the old authenticator configured thereon, the client authorizing the new authenticator by providing an authorization object to each relying party comprising the at least one key, data identifying the new authenticator, and cryptographic data to be used by the relying party to verify the authorization object; and
   wherein, in response to verifying the authorization object, each relying party registers the new authenticator;
   wherein an operation of generating at least one key is performed by the new authenticator;
   wherein identifying the plurality of relying parties comprises the new authenticator receiving a list of usernames and unique identification codes identifying each relying party from the old authenticator; and establishing a secure communication channel between the old authenticator and the new authenticator, wherein the new authenticator receives the list of usernames and unique identification codes identifying each relying party from the old authenticator over the secure communication channel.

13. The non-transitory machine-readable medium as in claim 12 wherein the data identifying the new authenticator comprises an Authenticator Attestation ID (AAID).

14. The non-transitory machine readable-medium as in claim 12, wherein the authorization object further comprises a first unique identification code identifying the relying party's service.

15. The non-transitory machine-readable medium as in claim 12 wherein the authorization object further comprises a username/UserID identifying a user account at each relying party.

16. The non-transitory machine-readable medium as in claim 15 wherein generating at least one key comprises generating a public/private key pair for each relying party and wherein the public key of the key pair is provided in the authorization object to the relying party.

17. The non-transitory machine-readable medium as in claim 12 wherein the cryptographic data comprises a signature generating using a private key of the old authenticator.

18. The non-transitory machine-readable medium as in claim 17 wherein the signature is generated over contents of the authorization object.

19. The non-transitory machine-readable medium as in claim 12 wherein generating at least one key comprises the new authenticator generating a public/private key pair for each pair of the username and unique identification codes to identify each relying party.

20. The non-transitory machine-readable medium as in claim 12 wherein the old authenticator is configured within a control system managed by an organization, the new authenticator is configured within a staff computer of the organization, and the relying party comprises a trust anchor managed by the organization.

21. The non-transitory machine-readable medium as in claim 12 wherein the secure communication channel comprises a Bluetooth channel, Near Field Communication channel, WiFi channel, or Ethernet channel.

22. The non-transitory machine-readable medium as in claim 12 wherein the old authenticator (Aold) displays the unique identification code for a first relying party and a public key hash of the key on a secure display used for transaction confirmation operations and wherein the new authenticator (Anew) displays the public key hash derived from a public key extracted from an authenticated message received from Aold and also displays the unique identification code for the first relying part and the public key hash on its secure display, thereby allowing the user to verify the correctness of the operation even in the case of compromised client devices.

23. A method for authorizing a new authenticator comprising:
identifying a plurality of relying parties with which an old authenticator is registered;
generating at least one key for each of the plurality of relying parties;
authenticating with each of the relying parties using a client having the old authenticator configured thereon, the client authorizing the new authenticator by providing an authorization object to each relying party comprising the at least one key, data identifying the new authenticator, and cryptographic data to be used by the relying party to verify the authorization object;
wherein, in response to verifying the authorization object, each relying party registers the new authenticator;
wherein the operation of generating at least one key is performed by the new authenticator;
wherein identifying the plurality of relying parties comprises the new authenticator receiving a list of usernames and unique identification codes to identify each relying party from the old authenticator; and
wherein generating at least one key comprises the new authenticator generating a public/private key pair for each pair of the username and unique identification codes to identify each relying party.

24. A non-transitory machine-readable medium having program code stored thereon which, when executed by one or more computing devices, causes the one or more computing devices to perform the operations of:
identifying a plurality of relying parties with which an old authenticator is registered;
generating at least one key for each of the plurality of relying parties;
authenticating with each of the relying parties using a client having the old authenticator configured thereon, the client authorizing the new authenticator by providing an authorization object to each relying party comprising the at least one key, data identifying the new authenticator, and cryptographic data to be used by the relying party to verify the authorization object; and
wherein, in response to verifying the authorization object, each relying party registers the new authenticator;
wherein the operation of generating at least one key is performed by the new authenticator;
wherein identifying the plurality of relying parties comprises the new authenticator receiving a list of usernames and unique identification codes to identify each relying party from the old authenticator; and
wherein generating at least one key comprises the new authenticator generating a public/private key pair for each pair of the username and unique identification code to identify each relying party.

* * * * *